(12) United States Patent
Anvekar et al.

(10) Patent No.: US 7,221,951 B2
(45) Date of Patent: May 22, 2007

(54) METHOD AND SYSTEM FOR SHORT MESSAGE SERVICE EXCHANGE AND TELECONFERENCING

(75) Inventors: Dinesh Kashinath Anvekar, Karnataka (IN); Bhaskarpillai Gopinath, Topanga, CA (US); Rajiv Mangla, New Delhi (IN); Sridhar Sundaram, Cupertino, CA (US)

(73) Assignee: Level Z, L.L.C., Piscataway, NJ (US)

( * ) Notice: Subject to any disclaimer, the term of this patent is extended or adjusted under 35 U.S.C. 154(b) by 1082 days.

(21) Appl. No.: 10/027,572

(22) Filed: Dec. 20, 2001

(65) Prior Publication Data
US 2003/0054844 A1 Mar. 20, 2003

Related U.S. Application Data

(60) Provisional application No. 60/322,669, filed on Sep. 17, 2001.

(51) Int. Cl.
*H04Q 7/20* (2006.01)
*H04M 7/22* (2006.01)
*H04M 3/42* (2006.01)
*H04M 1/00* (2006.01)

(52) U.S. Cl. .................. 455/466; 455/414.1; 455/416; 455/550.1; 455/556.2

(58) Field of Classification Search ................ 455/466, 455/416, 414.1, 418–420, 550.1, 556.2; 370/261–265; 348/211.12
See application file for complete search history.

(56) References Cited

U.S. PATENT DOCUMENTS

| | | | |
|---|---|---|---|
| 5,577,103 A | 11/1996 | Foti | |
| 5,787,357 A | 7/1998 | Salin | |
| 5,903,726 A | 5/1999 | Donovan et al. | |
| 6,026,296 A * | 2/2000 | Sanders et al. | 455/426.1 |
| 6,175,743 B1 * | 1/2001 | Alperovich et al. | 455/466 |
| 6,263,212 B1 | 7/2001 | Ross et al. | |
| 6,560,456 B1 * | 5/2003 | Lohtia et al. | 455/445 |
| 6,611,516 B1 * | 8/2003 | Pirkola et al. | 370/352 |
| 6,757,531 B1 * | 6/2004 | Haaramo et al. | 455/414.1 |
| 2001/0003094 A1 | 6/2001 | Foll | |
| 2001/0011020 A1 | 8/2001 | Nahm | |
| 2002/0177455 A1 * | 11/2002 | Lehto et al. | 455/466 |

FOREIGN PATENT DOCUMENTS

WO   WO 99/57927   * 11/1999

* cited by examiner

*Primary Examiner*—Meless Zewdu
(74) *Attorney, Agent, or Firm*—John T. Peoples

(57) ABSTRACT

In a short message service (SMS) wireline/wireless message system, a separate SMS exchange subsystem implements value-added service capability. The value addition service may range, for example, from simple data insertion in the SMS message to the more complex initiation of a teleconference call using inter-exchanged SMS messages.

4 Claims, 17 Drawing Sheets

610

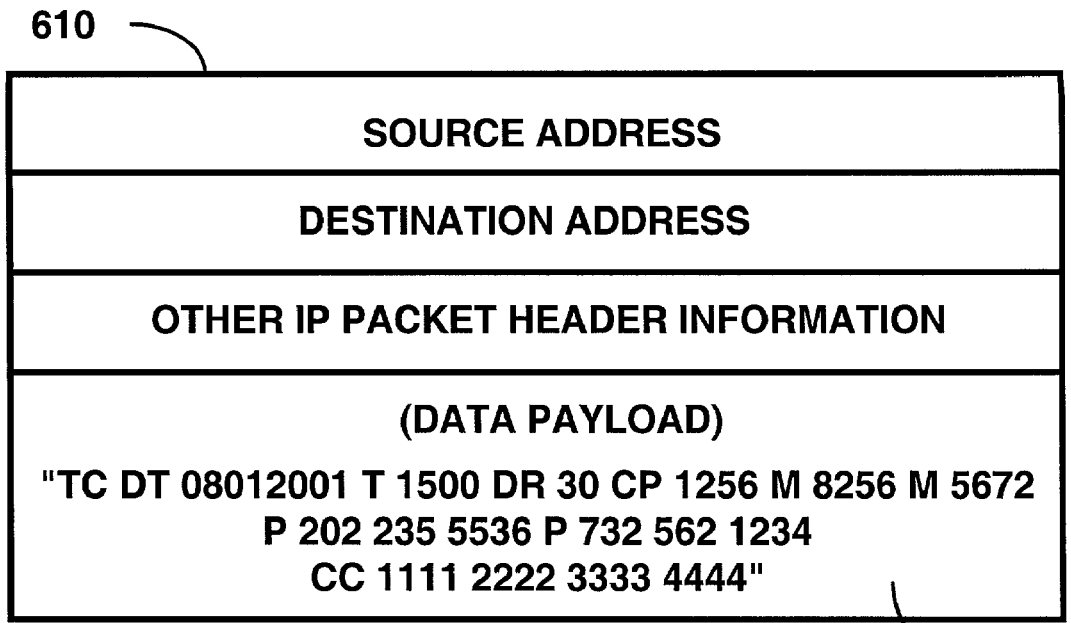

SOURCE ADDRESS

DESTINATION ADDRESS

OTHER IP PACKET HEADER INFORMATION (DATA PAYLOAD)

```
<TELECONFERENCE>
<DATE>      <DAY> 01</DAY> <MONTH>08</MONTH>
            <YEAR>2001</YEAR>
</DATE>
<TIME> 1500 </TIME>
<DURATION> 30 </DURATION>
<CHAIRPERSONID> 1256 </CHAIRPERSONID>
<MEMBERS>
            <MEMBERID>8256</MEMBERID>
            <MEMBERID>5672</MEMBERID>
</MEMBERS>
<PHONES>    <PHONE>202 235 5536 </PHONE>
            <PHONE>732 562 1234 </PHONE>
</PHONES>
<CREDITCARDNO> 1111 2222 3333 4444</CREDITCARDNO>
</TELECONFERENCE>
```

| MEMBER IDENTIFIER 810 | NAME 815 | PROFILE INFORMATION 820 | | PASSWORD 825 |
|---|---|---|---|---|
| | | PHONE NUMBER | EMAIL | |
| 2592 | JOHN JACOB | 732-117-5732 | jj@abc.xyz | abcdefg |
| 1521 | JAY HARI | 408-197-1156 | jh@pqr.mno | pqrstuv |

700

R1
R2

| SM ID 910 | MEMBER ID 915 | SM ORIGINATION 920 | SM DESTINATION 925 | SM CONTENTS 930 | VALUE-ADDED SERVICE CODE 935 | DELIVERY STATUS 940 |
|---|---|---|---|---|---|---|
| 123788 | 2592 | 732 117 5732 | 732 765 4321 | SEND QUOTE TO <MYEMAIL> | 123 | CANNOT DELIVER |
| 123789 | 2592 | 732 117 5732 | 732 111 3333 | PROJECT MEETING IS CANCELED | 456 | PENDING |
| 123790 | 1144 | 123.69.25.120 | 732 111 2222 | CALL ME AT 7 PM | 456 | DELIVERED |

| MEMBER IDENTIFIER 1210 | MEMBER NAME 1220 | MEMBER'S TELECONFERENCE PHONE NUMBER 1230 |
|---|---|---|
| 1952 | JOHN GOODMAN | 635-117-5732 |
| 7732 | HARI JACOB | 202-197-1156 |

R5
R6

| SESSION IDENTIFIER 1310 | CHAIRPERSON IDENTIFIER 1320 | CREDIT CARD NUMBER 1330 | DURATION 1340 | PARTICIPANTS 1350 |
|---|---|---|---|---|
| 123456 | 1723 | 1111-2222-3333-4444 | 50 MIN. | MEMBERS: 1153,1291 TELEPHONES: 732 259 1122 |
| 789012 | 9376 | 5555-6666-7777-8888 | 30 MIN. | MEMBERS: 8176,1132 TELEPHONES: 908 519 1234, 732 123 4567 |

| SESSION IDENTIFIER 1410 | LINK TO AUDIO STREAMS 1420 |
|---|---|
| 123456 | C:/CONF/AUDIO/ABC.XYZ |
| 789012 | D:/TELE/AUD.XYZ |

R9 → row 1
R10 → row 2

TELECONFERENCE NAME: [        ]

DATE: DAY [  ] MONTH [  ] YEAR [  ]

TIME: [    ] ○ AM ○ PM

CHAIRPERSON MEMBER IDENTIFIER NUMBER: [    ]

MEMBER IDENTIFIER NUMBERS: [        ]

PHONE NUMBERS: [        ]

CREDIT CARD NUMBER: [        ]

FIG. 16

METHOD AND SYSTEM FOR SHORT MESSAGE SERVICE EXCHANGE AND TELECONFERENCING

CROSS REFERENCE TO RELATED APPLICATION

This application is a non-provisional application of provisional application Ser. No. 60/322,669 filed Sep. 17, 2001.

BACKGROUND OF THE DISCLOSURE

1. Field of the Invention

This invention relates generally to wireless networks and, more particularly, to a methodology and a concomitant system whereby a short message service exchange effects value-added functionality, including teleconferencing, based on the contents of a short message.

2. Description of the Background Art

A Short Message Service (SMS) enables a mobile subscriber in a mobile wireless network to send and receive short alphanumeric messages through his/her mobile station. The mobile station in the modern wireless networks can be a cellular phone, a personal digital assistant (PDA), a laptop or any portable device capable of communicating with the wireless network equipment and having an alphanumeric display. With the advent of integration of some of the functionalities of wireless communication services with the Internet, it is also possible to send and receive short messages from a fixed communication station such as an Internet-connected computer.

A high-level block representation of a conventional SMS communication system 100 is shown in FIG. 1. A short message (SM) can originate from a wireless device such as a cell phone 120, a computer 105 connected to the Internet 110, or any similar device. A SM originating from a wireless device 120 is received by a Mobile Switching Center (MSC) 115 via the wireless medium 121 and other entities such as a base station not shown in the figure for simplicity. The MSC then sends the SM to the applicable SMSC (Short Message Service Center) 135 through the network cloud 130 comprising PSTN, wireless cellular, and other specific networks such as the well-known signaling system 7 (SS7) or even proprietary networks. SMSC 135 then determines the destination of the SM (in this example, mobile station 145), and routes it to the appropriate MSC 140, which then delivers the SM to the destination device 145. While two distinct MSCs are shown in FIG. 1 for generality, in cases where the destination device is in the same area as the SM originating device, the SM is handled by a single MSC. Similarly, it is also clear that computer 105 connected to the Internet 110 can transmit the SM to SMSC 135 for handling as outlined above for delivery to mobile station 145. Moreover, the above description of a conventional SMS system is highly simplified to bring out the underlying processes. However, even in the simplified form, it is readily appreciated that in current SMS systems the SM is just delivered to the destination device in the same form it is sent from the originating device. But, with further reflection, it is soon realized that there exists a great potential for using SMs in a SMS system to initiate different operations based on the contents of the SMs. Also, an SM can be preprocessed and valuable information may be added before delivery to the final recipient. These features are not utilized in the state-of-the-art SMS systems. Furthermore, SMs can be used to initiate specific operations at the destination. Keeping this in view, the subject matter of the present invention relates to an SMS exchange that performs value-addition functions based on the contents of SMs.

Another aspect of the subject matter of the present invention relates to initiating a teleconference from a cell-phone through the SMS exchange utilizing the value-added functionality of SMs. Teleconferencing among three or more individuals with cellular phones is a very useful communication service in the today's environment. People on the move are greatly helped by such a service in making decisions and planning future activities. However, in the current state-of-the-art, a person initiating a teleconference or, e.g., that person's secretary, is required to call each of the participants and conduct the teleconference. There is now a need for an automated system that can manage a teleconference without the intervention of the person initiating the teleconference. Also, other automated functions such as reminding a user about some event or providing the user with some information at a time pre-selected by the user are possible with such a telecommunication service. A major benefit of such a system is that a user can coordinate activities such as teleconferencing, tele-reminding or timed tele-messaging even when the user is on the move without physical access to a computer with connection to the Internet.

Discussed below are representative references that provide a backdrop for the subject matter of the present invention. The SMS exchange with value-addition features and the SMS-based teleconferencing system in accordance with the present invention are not taught or suggested by this art.

U.S. Patent Application No. 20010003094 by Foll describes a method and mobile communications system for controlling a short message service. In this invention, on the basis of the fact that short messages are sent by a communication terminal of a mobile subscriber into a mobile radio network and are routed to a switching facility responsible for the mobile subscriber, a short message together with an address that identifies a service facility responsible for dealing with the short message service for a mobile subscriber is received by the switching facility. The short messages are routed for temporary storage in the service facility and for transmission to a communication terminal of another subscriber if the received address is contained in an address table of the switching facility.

U.S. Patent Application No. 20010011020 by Nahm pertains to a method for transferring and reflecting message by using short message service in a portable digital phone. In this invention, a method for operating an SMS in a portable digital phone, more particularly a method for transferring and responding to a message using an SMS in a portable digital phone, is described. The method according to the invention includes the steps of drafting a message with a plurality of optional messages by a sending party, transferring the optional messages as an SMS message during a transferring mode, and receiving and responding to the sender's message by selectively responding to the optional messages.

U.S. Pat. No. 6,263,212 issued to Ross et al. describes a short message service center. The short message service center allows processing characteristics to be modified for service users within a given type so that the storage and delivery of short messages to one service user of a given type may be different for another service user within the same given type. The short message service center alleviates some of the potential "jams" associated with the processing of large distribution lists and closed user groups. The short message service center further allows for distributed administration. Additionally, the short message service center receives a short message in one standard format and delivers the short message in another standard format. The short message service center utilizes both a table routing method and a global title translation method for routing messages to a recipient. It allows a complete transmission of short messages between service entities having differing short message length definitions and has capability for dynamic system re-configuration.

U.S. Pat. No. 5,903,726 issued to Donovan et al. describes a system using portion of a short message payload to identify short message service types and delivering the message if user subscribes to the services. A system and method for providing enhanced short-message service options in PCS systems is described. The generic short-message service is split into unbundled short-message service applications (e.g., emergency messaging, voice mail alert, etc.). Each of these unbundled short message services is recognized at short-message systems, home location registers, and subscriber terminals.

U.S. Pat. No. 5,787,357 issued to Salin pertains short message processing in a mobile exchange. In this invention, a method is described for processing a short message received at a mobile exchange in a cellular radio network, for delivering one short message at a time to a B subscriber. An operation controller is used for observing the operation of the B subscriber so as to detect the delivery of the short message and to prevent the delivery of another short message when the delivery of the preceding short message is in progress. A memory is used for storing rejected short messages and a queue control is adopted responsive to the B-subscriber operation controller for reading the rejected short message from the memory so as to initiate the delivery of the short message to the B subscriber when the delivery of the preceding short message is completed.

U.S. Pat. No. 5,577,103 issued to Foti describes a method of providing service information from a subscriber service profile to subscribers in a cellular telecommunications network using the short message service. The network includes a mobile station having a visual display, a mobile switching center, and a home location register for storing the subscriber service profile. A request for the service profile information is transmitted from the mobile station to the mobile switching center and the home location register. The mobile switching center retrieves the service profile information from the home location register. The service profile information is appended to an SMS message that is transmitted from the mobile switching center to the mobile station. The service profile information is then provided in a voice message or displayed on the visual display of the mobile station. Thus, this invention provides only basic additional processing of an SMS message before delivery to the final recipient.

While the above representative art deals with various aspects of SMS message systems, the art is devoid of a separate SMS exchange with value-addition capability in accordance with the present invention. Moreover, the art is devoid of value addition service involving initiation of a teleconferencing system by using SMS messages such as described herein.

SUMMARY OF THE INVENTION

These shortcomings and other limitations and deficiencies are obviated in accordance with the present invention by a method, and concomitant circuitry, to implement short message value-added services.

In accordance with one broad method aspect of the present invention, a method for processing a short message service (SMS) message includes: (a) embedding a value-added field in the SMS message by the originator of the SMS message, the field being indicative of a value-added service requested by the originator, and (b) implementing the value-added service based upon the SMS message.

In accordance with yet another broad method aspect of the present invention, a method for establishing a teleconference via a short message service (SMS) message includes: (a) embedding a teleconference directive in the SMS message by the initiator of the teleconference, and (b) implementing the value-added service based upon the teleconference directive.

Broad system aspects of the present invention are commensurate with the aforementioned broad method aspects.

BRIEF DESCRIPTION OF THE DRAWINGS

The teachings of the present invention can be readily understood by considering the following detailed description in conjunction with the accompanying drawings, in which:

FIG. 8 depicts exemplary records in the member database of FIG. 7;

FIG. 9 depicts exemplary records in the SM delivery database of FIG. 7

FIG. 12 illustrates the layout of the member database of the memory in FIG. 11;

FIG. 13 illustrates the layout of the session database of the memory in FIG. 11;

FIG. 14 illustrates the composition of the proceedings database of the memory shown in FIG. 11;

FIG. 16 illustrates the Web page format for requesting a teleconference.

To facilitate understanding, identical reference numerals have been used, where possible, to designate identical elements that are common to the figures.

DETAILED DESCRIPTION

Figure 1:
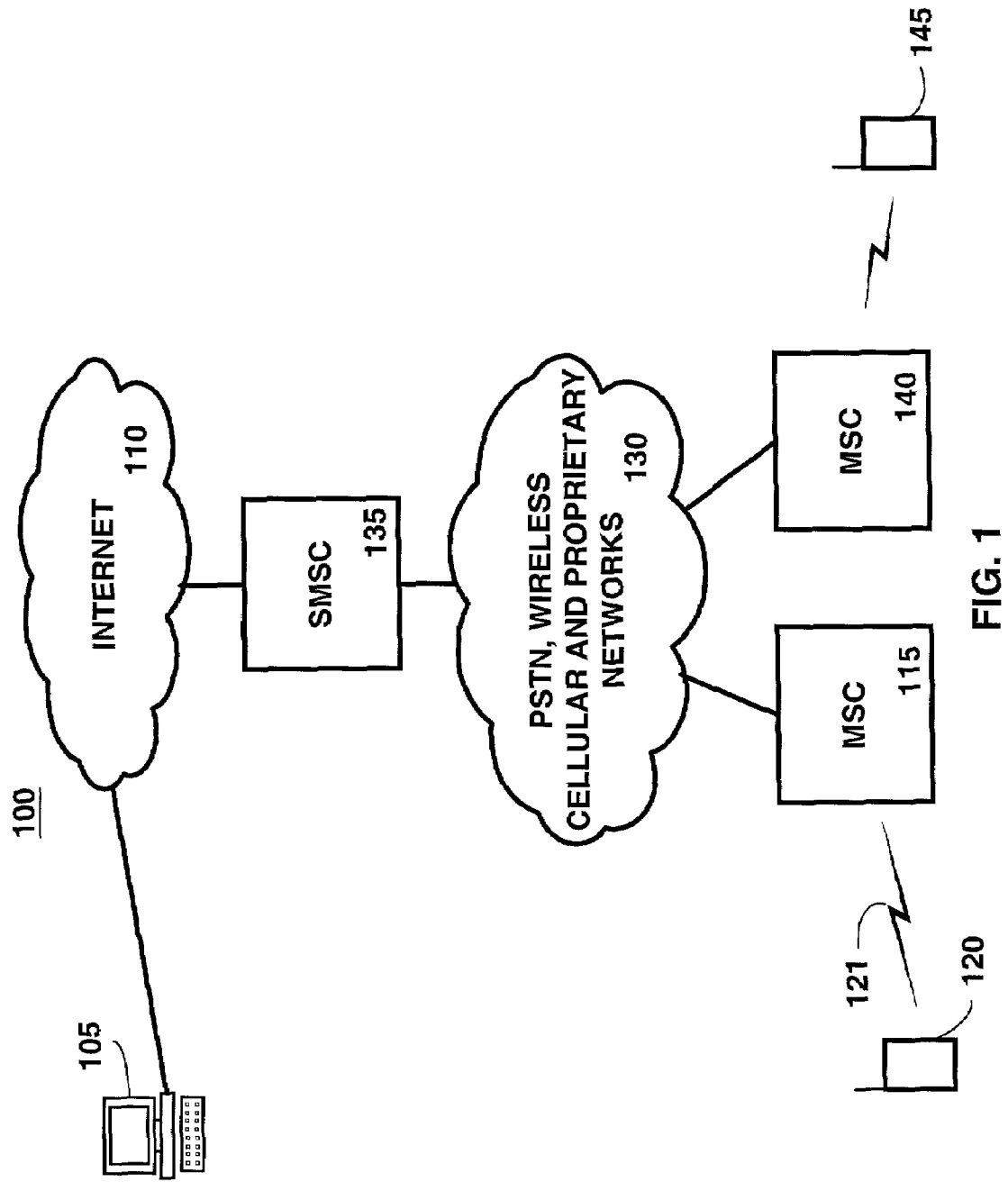
FIG. 1 is a high-level block diagram of a wireless system used to describe a conventional short message service involving mobile devices such as a cell-phone.
Figure 2:
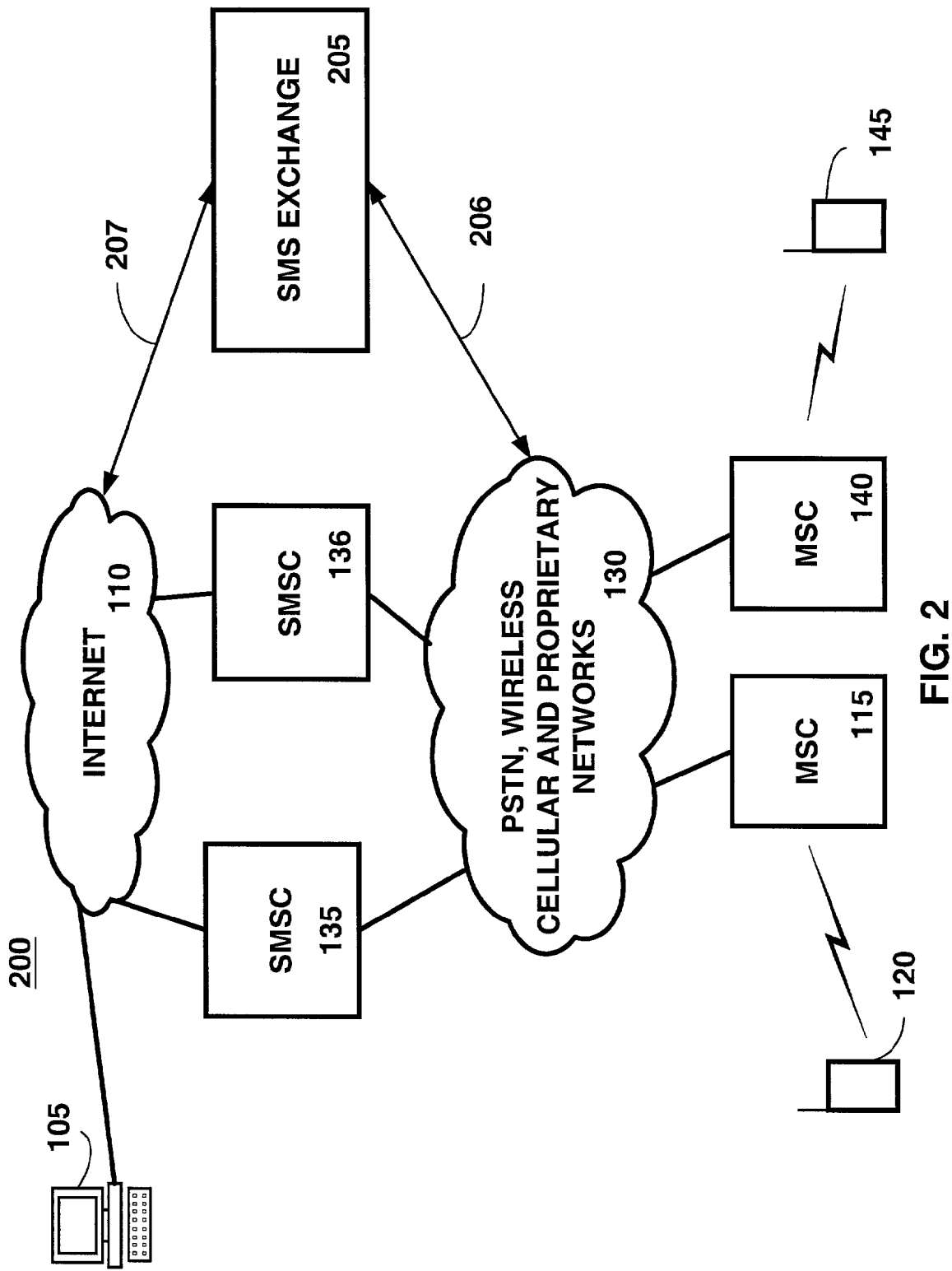
FIG. 2 is a high-level block diagram of a short message service system wherein a short message service exchange in accordance with the present invention is shown in overlay fashion on the system of FIG. 1.
Figure 3:
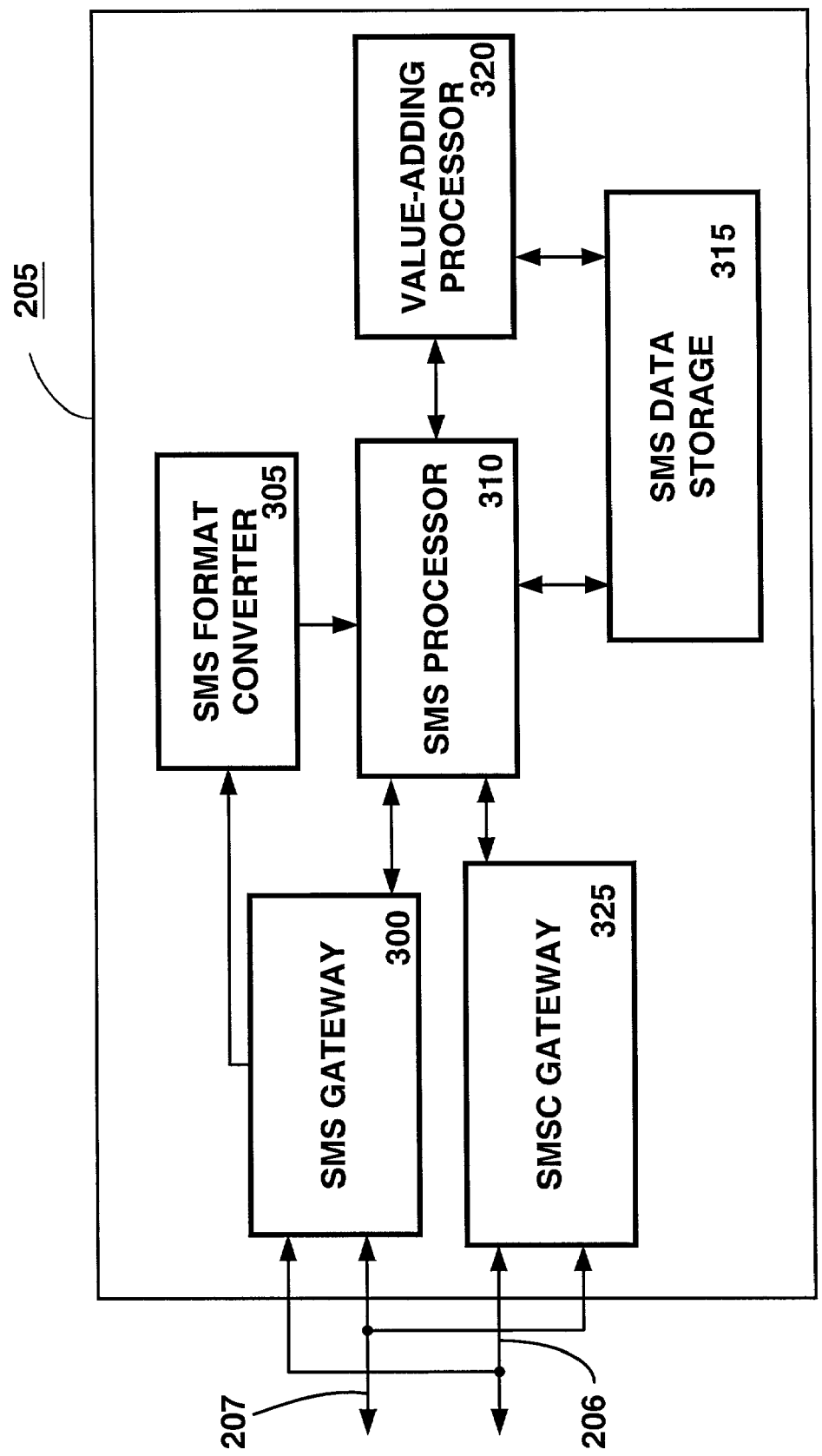
FIG. 3 is a high-level block diagram depicting the components of the short message service exchange of FIG. 2.
Figure 4:
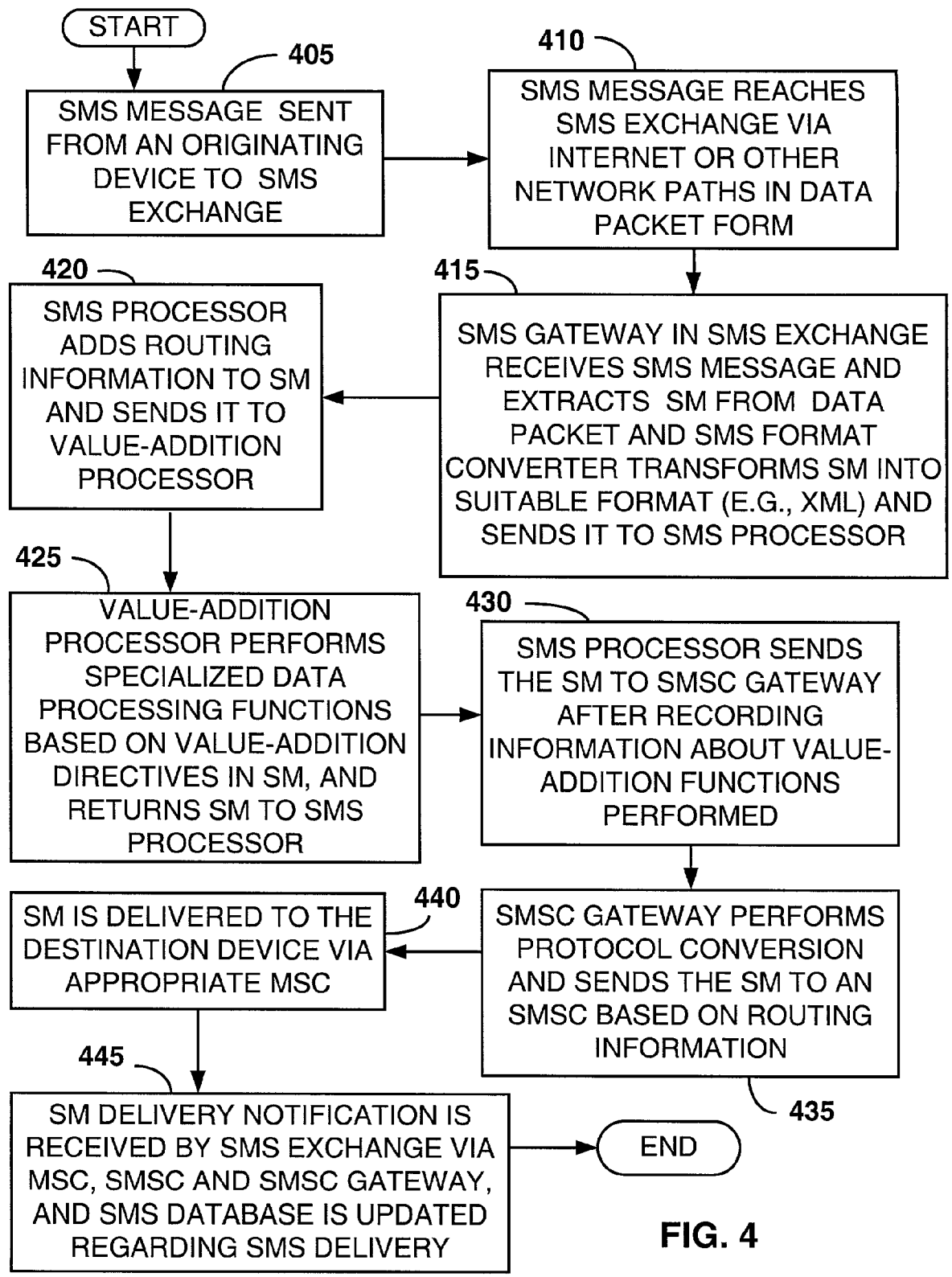
FIG. 4 is a flow chart depicting the processing to deliver a short message for implementing value-added functionality.

A high-level circuit block diagram of SMS system 200 for an embodiment in accordance with the present invention is shown in FIG. 2 wherein an SMS exchange performs value-addition to SMs in addition to normal routing and sending of SMs; FIG. 2 is a modified depiction of FIG. 1 wherein SMS exchange 205 is shown in overlay fashion on the components of FIG. 1. In system 200, all SMs pass through the SMS exchange 205 before reaching their respective destinations. The different components of the SMS exchange 205 are shown in FIG. 3 (to be discussed shortly in conjunction with FIG. 4). Each of these components may be implemented on one or more separate computers or may be integrated on a single computer depending on the desired SMS rate handling capacity. A flowchart showing the steps in delivering an SM is shown in FIG. 4, and includes the following processes:

Process 405: An SM is originated, for example, in SMS system 200 by computer 105 or wireless device 120. If the SM is sent from a computer 105, it is sent to the IP (Internet Protocol) address of the SMS exchange 205 via link 207. In case the SM is sent from a wireless device such as cell-phone 120, it is directed to the phone number that corresponds to the SMS exchange 205 via phone line 206. An exemplary message sent from computer 105 to the Internet e-mail address SMdest@isp.com may be of the form "send quote to <myemail> and call me on<myphone>". The value-added service corresponding to this message is the replacement of the alias names between the delimiters '<' and '>', namely, 'myemail' and 'myphone', with the actual e-mail address and phone number of the originator.

Process 410: In the case of the SM originating from an Internet connected device 105, the SM directly arrives at the SMS exchange via the Internet 110 over link 207. But, an SM originating from a wireless device 120 first arrives at an SMSC 135 via an MSC 115. The SMSC 135 forwards the SM to an SMS exchange 205. An SM thus arrives at the SMS exchange 205 via a communication network such as the Internet 110, or a network 'cloud' 130 comprising PSTN, wireless cellular networks or other networks. In either case, the SM arriving at the SMS exchange is encapsulated within a data packet.

Figure 5:
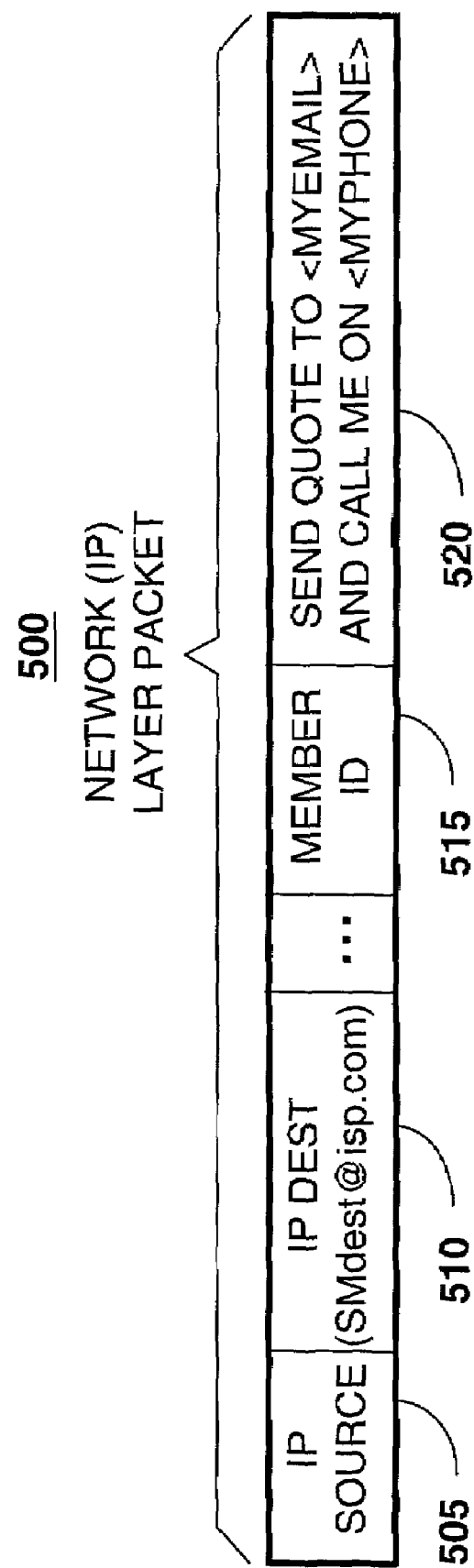
FIG. 5 depicts the layout of a data packet for an exemplary short message wherein keywords are replaced by actual data for a given originator/member.

A data packet corresponding to the aforementioned exemplary message is shown in FIG. 5. As is typical, the IP layer packet 500 has header information such as IP source (505), IP destination (510), member field (515), and so forth, as well as a data payload field (520). The utility of the member field will be discussed below.

Process 415: In the SMS exchange 205, the SMS gateway 300 of FIG. 3 extracts the contents of the SM from the different formats in which they arrive. For instance, an SM received via the Internet will usually be in the form of IP (Internet Protocol) packets. The extracted SM is then sent to an SMS format converter 305. The raw SM is generally in alphanumeric text form along with other information pertaining to the source and destination. The SMS format converter 305 transforms the contents of the SM into a format suitable for efficient processing by the SMS processor 310. An example of such a format in the current state of the art is the XML (Extensible Markup Language) format. With XML, customized tags and other overlay data are added to the raw SM contents to enable value addition functions to be performed efficiently.

Figure 6:
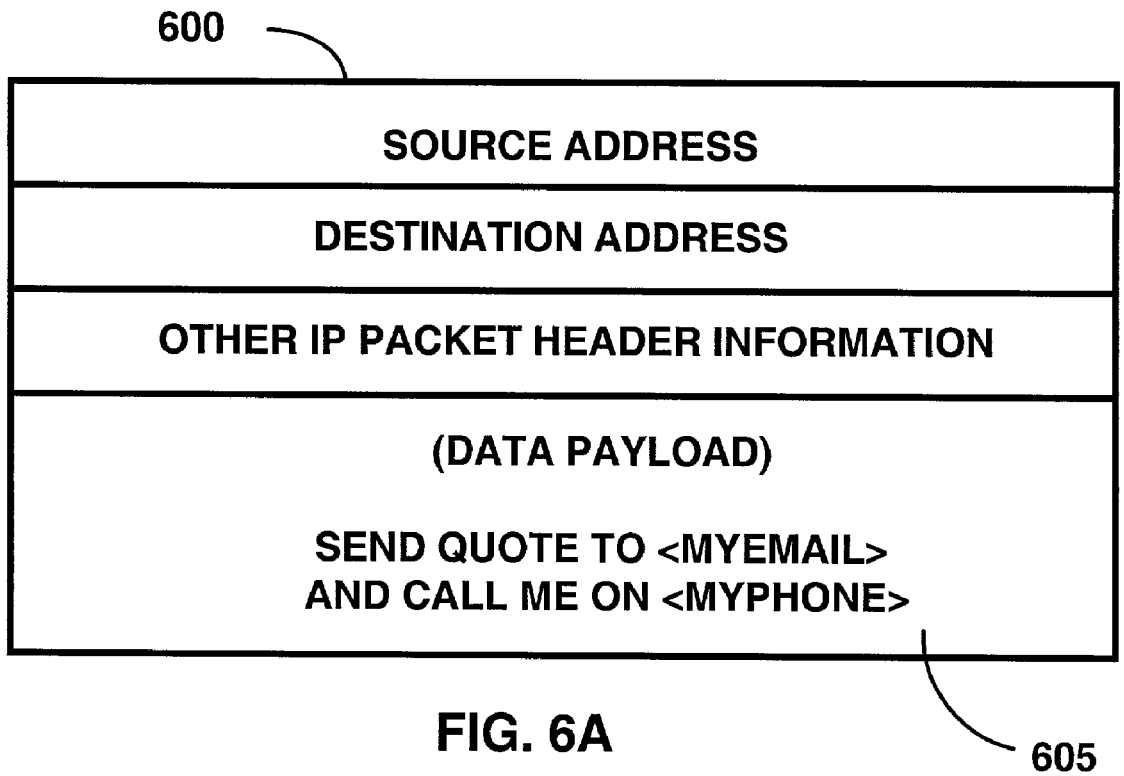
FIG. 6A depicts the raw text of the data packet of FIG. 5 in top-down fashion.
FIG. 6B depicts the conversion of the raw text of FIG. 6A into the Extensible Markup Language (XML) format wherein data items are tagged by customized XML tags.
FIG. 6C depicts another example of the raw text of a data packet which contains data to invoke a teleconference.
FIG. 6D depicts the conversion of the raw text of FIG. 6C into XML format.

As one example, a simplified format of IP packet 600 including an SMS message as data portion 605 is shown in FIG. 6A, which depicts the contents of FIG. 5 in a top-down manner. The raw ASCII text in the IP packet is converted into an XML format as shown in FIG. 6B. As seen here, data items are tagged by customized XML tags such as <KEYWORD> and </KEYWORD>. The processing of the SM contents by the inclusion of such tags becomes easier for other functional entities in the system.

As another example, a simplified format of IP packet 610 including an SMS message as data portion 615 is shown in FIG. 6C, which depicts a packet that may be used to set-up a teleconference (the details of teleconferencing will be discussed in the sequel). The raw ASCII text in the IP packet is converted into an XML format as shown in FIG. 6D. As seen here, each data item is tagged by customized XML tags such as <DAY> and </DAY>.

The SM in XML format is then passed on to the SMS processor 310.

Process 420: SMS processor 310 stores the source, destination and other relevant information for each message in the SMS data storage 315. Based on the destination information, SMS processor 310 adds routing information required for routing the SM as per a selected routing policy—such routing policies are conventional and as such are not encompassed by the present invention. For example, a least cost routing may be used to send the SM to optimize the communication costs, whereas a least time to deliver policy sends the SM along fast routes to minimize the total delivery time for urgent messages. SMS processor 310 accesses any information required for routing from the SMS Data Storage 315. The SMS processor 310 then sends the SM to the Value-Addition Processor (VAP) 320.

Process 425: The VAP 320 performs value addition functions on the SM based on the stored programs in its memory and the data in the SMS data storage 315. For instance, a user may instruct through his SM that his contact email be sent to the recipient of the SM by just typing the keyword 'myemail' in his SM, as exemplified by the data payload 520 in FIG. 5. Such keywords may be distinguished from regular text in the message by enclosing them in delimiters such as the ASCII characters '<' and '>'. Alternatively, for ease of composing an SM while sending from a cell-phone, a character such as 'K' may precede a key word. Thus, 'K myemail' would mean that 'myemail' is a keyword. Yet another alternative is to define a set of keywords that cannot be used in the normal text of an SM. The VAP then looks up that user's data, based upon the Member ID (515) in the SMS data storage 315 and inserts the user's full email address in place of the keyword 'myemail'. Similarly, a variety of value addition functions could be defined to perform value addition services based on different product definitions and policies specified in the SMS exchange system.

It is noted that there may be different product definitions within a given service type, and several policies could be defined for use under a given product definition. For example, under a service type called 'SMS initiated teleconferencing' (expanded upon later), one product P1 may be defined as teleconferencing with the maximum number of members limited to 5. Yet another product P2 may be restricted to members with cellular phones only. Further, under product P1, a policy may involve permitting members to join a teleconference within certain duration from the start of the teleconference, and yet another policy may allow members to join a teleconference at any time. The choice of a product and a policy will appropriately determine the cost for the service.

After fully processing the SM, VAP 320 then returns the SM to SMS processor 310.

Process 430: SMS processor 310 then records the completion of value-addition function and any identifiers required for costing and fee calculation for each SM or rating based on pre-defined SMS delivery plans. The SM is then sent to the SMSC gateway 325.

Process 435: SMSC gateway 325 converts the SM in XML format into formats suitable for sending them to standard state-of-the-art entities such an SMSC 135 or SMSC 136, as per well-known communication protocols. For instance, a common protocol used to communicate with a SMSC is the SMPP (Short Message Peer to Peer) protocol (see, for example, http://smsforum.net/doc/public/FAQ/Gen-FAQ.html). The SM is sent to SMSC 136 which has been chosen by the SMS exchange based on service agreements in force and SM routing algorithms used in the system.

Process 440: From SMSC 136, the SM is then delivered to the final recipient 145 via MSC 140 following the standard routing process.

Process 445: After successful delivery of an SM, a delivery notification message flows back to the SMS exchange 205 via MSC 140, SMSC 136, and SMSC gateway 325. The SMS processor 310 in the SMS exchange 205 then updates the database record for the SM with the delivery notification details in SMS data storage 315.

Figure 7:
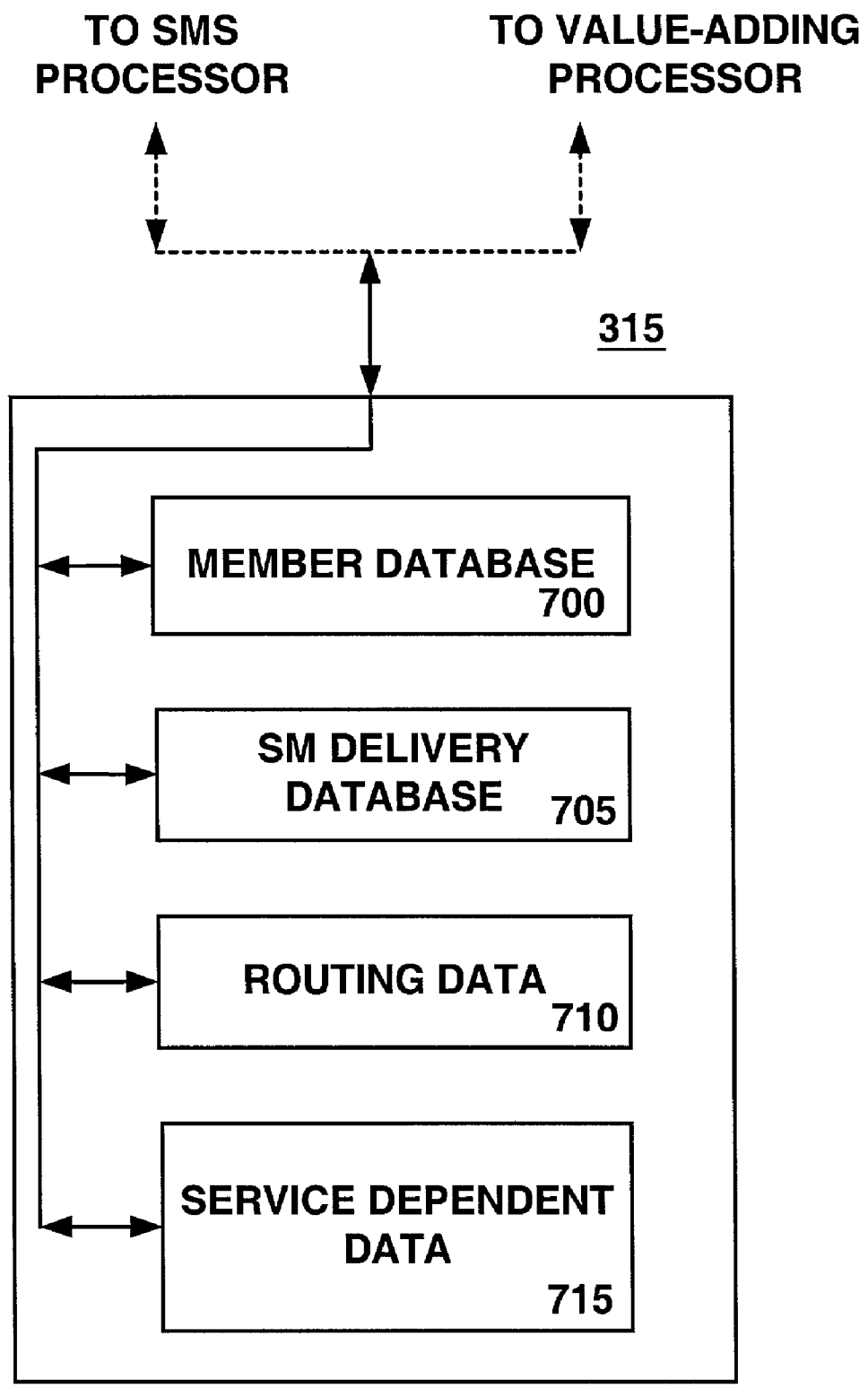
FIG. 7 depicts components of the SMS data storage device of FIG. 3.

Referring next to FIG. 7, a diagrammatic representation of an embodiment of SMS Data Storage 315 is shown. Data storage 315 is a memory that typically includes one or more machine-readable media. Such media include, as is well-known in the art, an appropriate combination of magnetic, semiconductor and optical media. Memory is preferably capable of supporting searching and storing of digital multimedia data such as text and audio. Memory (or portions thereof) may reside on single computer, or may be distributed in a known manner among multiple computers.

In the present embodiment, data storage 315 includes member database 700, SM delivery database 705, routing data 710, and other service dependent data 715.

The rows and columns of the databases described herein represent records and fields thereof, respectively. In the described embodiments, the databases are used in a relational arrangement, as is well-known in the art, so that the databases relate to one another by way of fields that store common data. It is to be noted that while the following description refers to specific individual databases, formats, records, and fields, those skilled in the art will readily appreciate that various modifications and substitutions may be made thereto without departing from the spirit and scope of the present invention.

Referring now to FIG. 8, an embodiment of member database 700 is depicted. Database 700 stores data relating to member accounts that are maintained for account holders. Each record (row) of database 700 represents such an account. For exemplary purposes, two records R1 and R2 are shown.

Field 810 stores a member identifier that is associated with and that uniquely identifies a member account. In this embodiment, the member identifier is a four-digit member number. The number of digits in this filed can be fixed depending on the maximum expected number of members in any SMS system. Other types of account identifiers with alphanumeric characters may be used if required. Field 815 is used to store the name of a member. In one embodiment, the name stored in field 815 is a digital audio file (or a pointer thereto) that contains a pre-recorded audio sample of the account holder's name. The audio recording of member names may be played back while interacting with users with telephone or other voice playback instruments. Field 820 stores the profile information of a member such as phone number and email address of the member. It is possible to store multiple possible phone numbers and emails here, and also other profile information not shown here. While sending SMs from devices other than a wireless phone a member is required to login using a password. Field 825 stores the member's password that is used to authenticate the use of the SMS system by the member.

Referring next to FIG. 9, an embodiment of SM Delivery database 705 is depicted in detail. Database 705 stores data relating to SMs processed through the SMS exchange. One record (row) of database 705 is maintained for each SM. For exemplary purposes, three records R3.1, R3.2 and R4 are shown. Field 910 stores an SM identifier that uniquely identifies an SM. For exemplary purposes, the SM identifier is shown as including six digits. Field 915 stores the identifier of the member who has sent the SM. Field 920 is used to store SM origination information that can be either a wireless phone number or the IP (Internet Protocol) address of the computer from which the SM has been sent. Similarly, field 925 stores the destination information for an SM, which can be a wireless phone number or an IP address. Field 930 stores the actual SMs in the form they were received. For simplicity in representation, only the ASCII characters of some sample SMS messages or parts of messages are shown in FIG. 9. Alternatively, pointers to SMs stored elsewhere in memory can be stored in field 930 (not exemplified). Field 935 stores a value-addition service code that indicates the type of value-addition function performed on an SM. The value-addition service code is useful for determining the charge incurred by a user in sending an SM. Different rating schemes can be applied while charging the SM senders based on different service plans to which the users can subscribe. Field 940 indicates the delivery status for an SM. The delivery status could indicate information about an SM delivery such as 'Delivered', 'Pending', or 'Cannot deliver'. This information can be made available to a sender of an SM at his/her mobile phone or computer.

Figure 10:
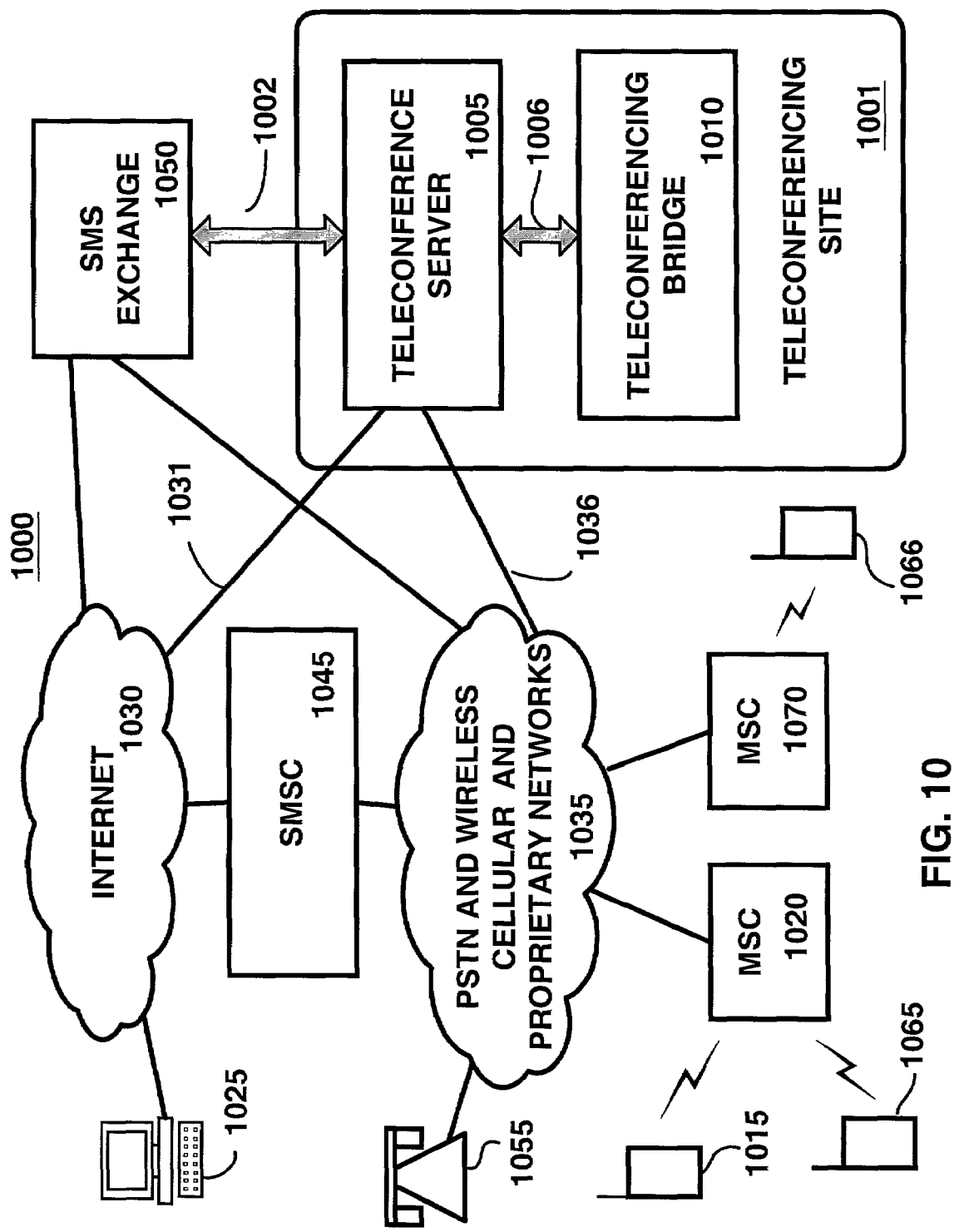
FIG. 10 depicts an illustrative embodiment of an SMS-based teleconference system in accordance with the present invention.

With reference again to FIG. 7, routing data 710 contains information about the different SMSC gateways and SMSCs and their connectivity data. As mentioned earlier, different services connected with SMS can be supported by the SMS system described herein. Relevant data required to support such services is represented in this embodiment as service dependent data 715. The contents of data 715 will be discussed in more detail below with respect to the teleconference service Teleconference Another preferred embodiment of this invention includes a system and method for establishing, maintaining, and taking down a teleconference among three or more individuals by using an SMS exchange. A schematic representation of SMS-based teleconferencing system 1000 is shown in FIG. 10. In this system, each participant has a telephone (wireless or wireline) and the person initiating the teleconference has a wireless cellular phone exemplified by phone 1015 capable of sending SMS messages via MSC 1020. Alternatively, a teleconference could also be initiated from computer 1025 connected to Internet 1030. Registered members only can initiate a teleconference. It may be noted that while a conventional wireline/landline telephone 1055 cannot be used to initiate a teleconference as it does not have SMS sending capability, it can still be included in a teleconference for voice based communication.

Teleconference site 1001 with teleconference server 1005 is linked to PSTN (Public Switched Telephone Network) and wireless cellular networks 1035 via landline connections 1036 and Internet 1030 via link 1031. Teleconferencing is made possible through teleconferencing bridge 1010 at teleconference site 1001. Teleconference server 1005 is interfaced to teleconferencing bridge 1010 for coordination of teleconferencing functions in the system. SMS messages indicating details of a teleconference are sent from SMSC 1045 to SMS exchange 1050, which is interfaced to teleconference server 1005, via networks 1035 or Internet 1030. It is assumed here that SMS exchange 1050 and teleconference server 1005 are geographically local to each other and so the communication between them also takes place over a geographically local interface 1002. However, SMS exchange 1050 and teleconference server 1005 may be located in different geographical locations and in that case, the communication between them would be through Internet 1030 or other networks 1035. Teleconferencing bridge 1010 is implemented utilizing any of a plurality of well-known state-of-the-art telephony switches such as, for example, the SwitchMaster™ bridge, a voice and data telephone switch manufactured by CadCom Telesystems, Inc. of Enid, Okla. It is to be noted that the system shown in FIG. 10 may include well-known internal connectors, architectures, interfaces, ports, and communication devices (e.g., modems) to enable processing and communication. For the purpose of focusing on the inventive subject matter, a detailed description of the same is omitted.

Figure 11:
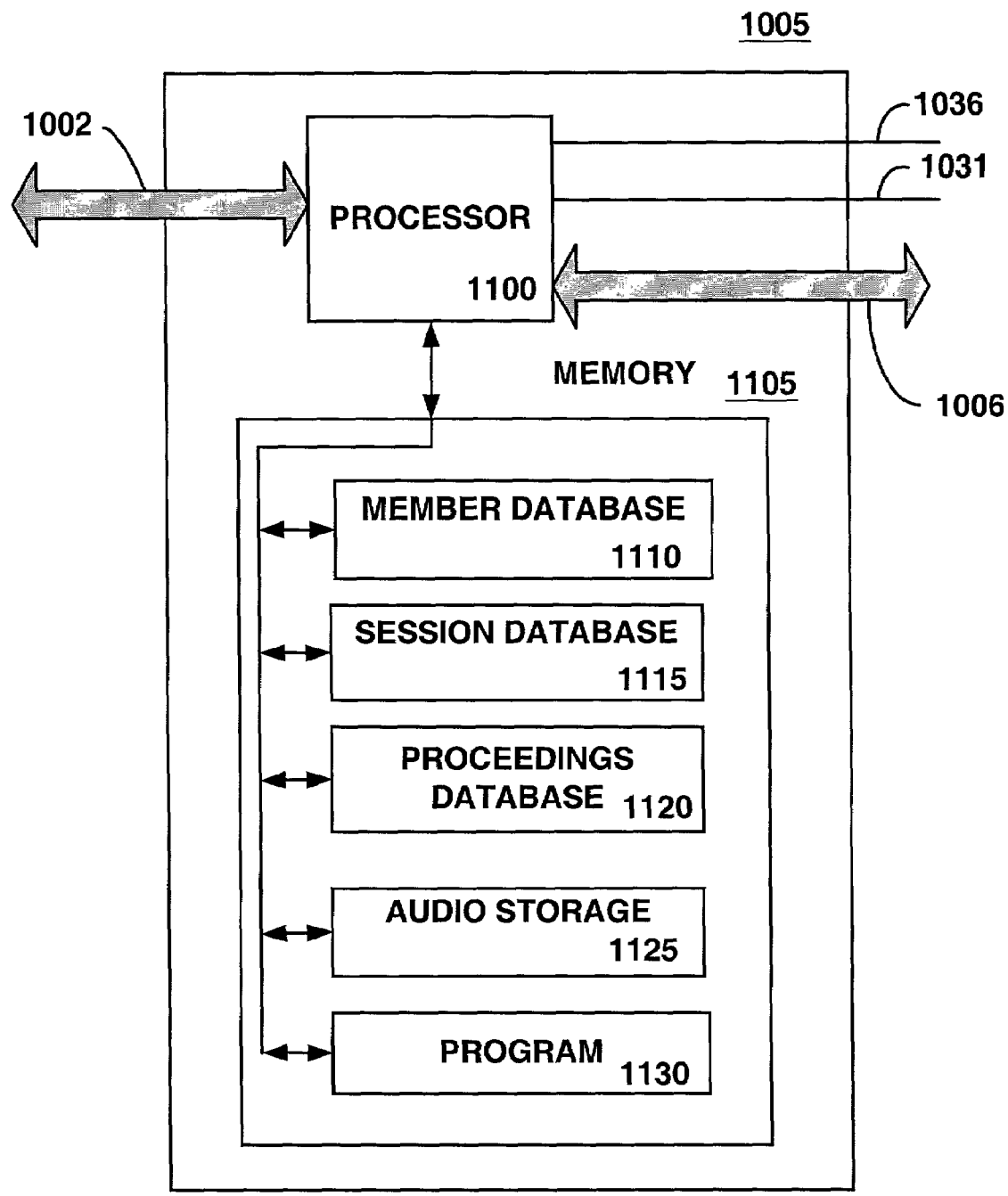
FIG. 11 depicts in high-level block diagram form the teleconference server of FIG. 10, including a processor and memory.

Referring next to FIG. 11, a diagrammatic representation of an embodiment of teleconference server 1005 is shown. Server 1005 typically includes memory 1105, and at least one processor 1100 in communication therewith. Processor 1100 is interfaced to SMS exchange 1050 via connection 1002 to receive SMS messages sent by an initiator of a teleconference. PSTN telephone lines 1036 are interfaced to processor 1100 through a standard PSTN interface. Processor 1100 also controls the switching and other functions of a teleconferencing bridge. It must be noted that the processor 1100 is interfaced to the SMS exchange 1050, PSTN 1035, and teleconferencing bridge 1010 through appropriate state-of-the-art interfaces, which are not shown in FIG. 9 to again focus on the inventive aspects of the subject matter.

Memory 1105 typically includes one or more machine-readable media. Such media include, as is well known in the art, an appropriate combination of magnetic, semiconductor and optical media. Memory is preferably capable of supporting searching and storing of digital multimedia data such as text and audio. Memory (or portions thereof) may reside on single computer, or may be distributed in a known manner among multiple computers.

In the present embodiment, memory 1105 includes member database 1110, session database 1115, proceedings database 1120 and audio storage 1125. Memory also stores program 1130, which includes instructions for controlling processor 1110 in accordance with the present invention.

The rows and columns of the databases described herein represent records and fields thereof, respectively. In the described embodiments, the databases are used in a relational arrangement, as is known in the art, so that the databases relate to one another by way of fields that store common data. It is to be noted that while the following description refers to specific individual databases, formats, records, and fields, those skilled in the art will readily appreciate that various modifications and substitutions may be made thereto without departing from the spirit and scope of the present invention.

Referring now to FIG. 12, an embodiment of member database 1110 is depicted in detail. Database 1110 stores data relating to member accounts that are maintained for account holders. Each record (row) of database 1110 represents such an account. For exemplary purposes, two records R5 and R6 are shown.

Field 1210 stores a member identifier that is associated with and that uniquely identifies a member account. In this embodiment, the member identifier is a four-digit member number. The number of digits in this field can be fixed depending on the maximum expected number of members in any teleconferencing system. Other types of account identifiers with alphanumeric characters may be used if required. Field 1220 is used to store the name of a member. In one embodiment, the name stored in field 1220 is a digital audio file (or a pointer thereto) that contains a pre-recorded audio sample of the account holder's name. The audio recording of member names may be played back while interacting with users with telephone or other voice playback instruments. Field 1230 stores the phone number of the member. It is possible to store multiple possible phone numbers here.

Referring next to FIG. 13, an embodiment of session database 1115 is depicted in detail. Database 1115 stores data relating to one or more sessions. One record (row) of database 1115 is maintained for each session. For exemplary purposes, two records R7 and R8 are shown. Field 1310 stores a session identifier that uniquely identifies a session. For exemplary purposes, the session identifier is shown as including six digits.

Field 1320 is used to store chairperson identifier that identifies a particular chairperson of a teleconference session. Field 1330 stores a credit card number of the chairperson. In this embodiment, a chairperson uses the credit card number to pay the costs associated with a teleconference session. However, in practice, other well-known payment means may be adopted. Field 1340 stores the duration of a teleconference and field 1350 stores the identification of participants of a teleconference in terms of their member numbers or telephone numbers.

Referring next to FIG. 14, an embodiment of proceedings database 1120 is depicted in detail. Database 1120 stores data that points to audio stream files. For exemplary purposes, two records R9 and R10 are shown. Field 1410 stores a session identifier that uniquely identifies a session. Field 1420 stores a pointer to the audio stream file that can be used to play back audio proceedings of a teleconference. In this embodiment, the identifier stored in field 1420 is a directory path in the audio storage 1125 in memory 1105. The audio storage space 1125 is a large block of free area where audio recordings of a teleconference can be stored. Authorized members of a teleconference system can later retrieve the stored audio recordings of the teleconference.

Teleconference Initiation and Dissolution

Figure 15:
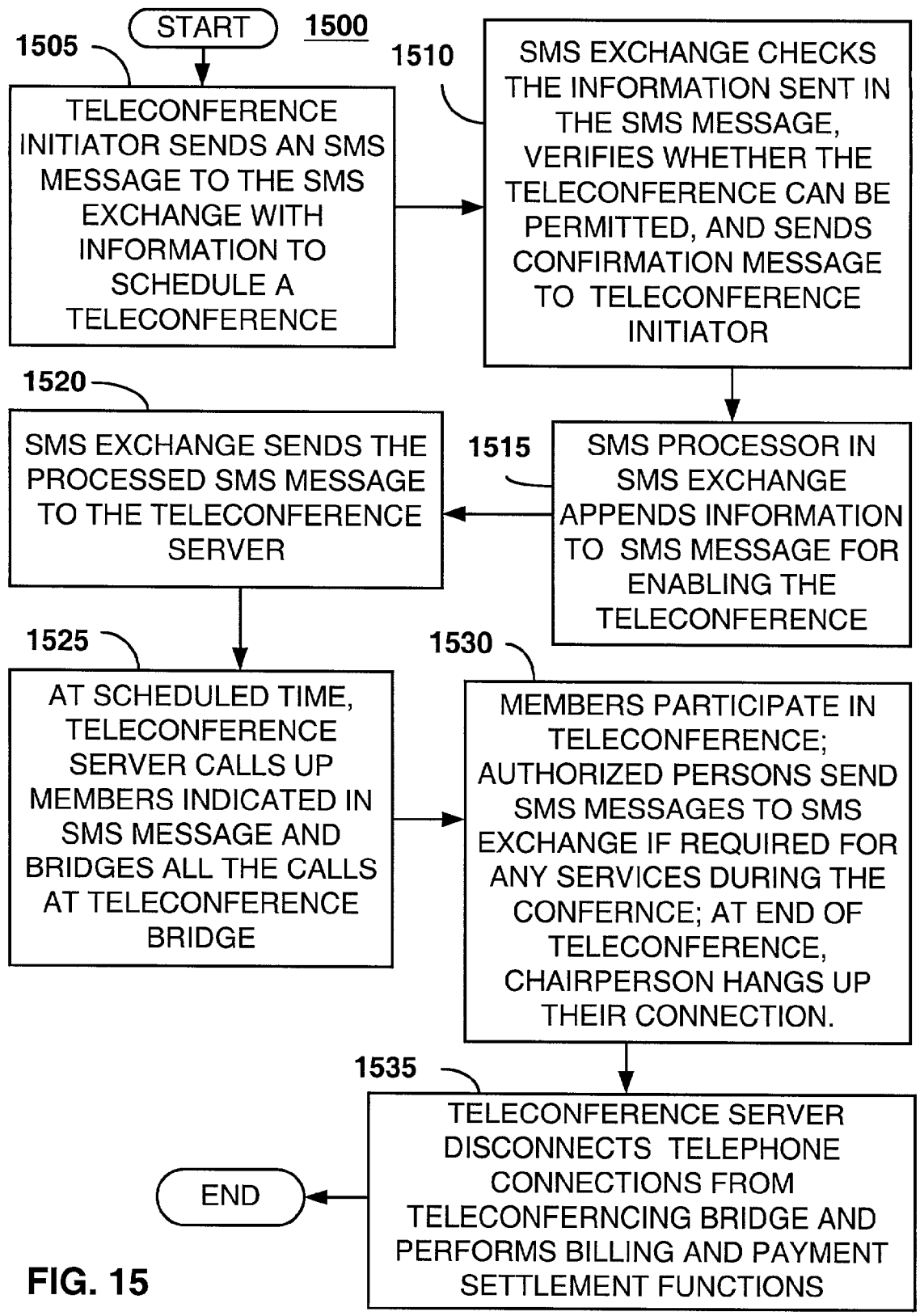
FIG. 15 is a flow diagram for the process of establishing and taking down of a teleconference.

FIG. 15 shows flowchart 1500 of teleconference initiation and dissolution process, including the following processes:

Process 1505: A teleconference is initiated and scheduled by a member by sending an SMS message to SMS exchange 1050 giving the necessary details about the teleconference. A typical SMS message has already been alluded to with respect to FIGS. 6C and 6D. Basically, the SMS message contains date, time, and duration of a teleconference, contact details of the participants and information for charging the cost of the teleconference. The SMS message shown in FIG. 6D is just an example format with abbreviated keywords that refer to a teleconferencing function. The abbreviations shown are: TC-TeleConference, DT-Date, T-Time, DR-Duration, CP-ChairPerson, M-Member, P-Phone number, and CC-Credit Card. However, while sending a teleconference initiation request from a computer, another more compatible user interface may be provided. For example, web page with a suitable format such as template 1600 shown in FIG. 16 may be used.

A member who conducts the teleconference is designated as the chairperson. A chairperson is accountable for call and other charges with reference to a teleconference conducted by him/her. The teleconference charges typically include the telephone call charges of all the participants, Internet connection charges, SMS processing fees and charges for usage of teleconference server and associated equipment.

Process 1510: SMS exchange 1050 processes the SMS message and checks whether all the information necessary for scheduling a teleconference is provided in the message, and whether sufficient resources in the teleconference bridge would be available for the duration of the teleconference. It also authenticates the chairperson's identity through member database 1110 and checks the validity of the credit card information. Any missing information is communicated to the teleconference initiator via an SMS message or Internet message in case of teleconference initiation through an Internet connected computer. After ascertaining that the teleconference can be scheduled, the SMS exchange sends a confirmation message to the teleconference initiator.

Process 1515: SMS processor 1100 then appends information such as telephone numbers of members identified by their member identifiers and credit card number to the SMS message for enabling the scheduling of the teleconference by the teleconference server 1005.

Process 1520: SMS 1050 exchange sends the processed SMS message to the teleconference server 1005.

Process 1525: At the scheduled time of a teleconference, the teleconference server 1005 calls up the chairperson's phone (e.g., 1015) first and indicates the starts of the teleconference. The other participants' phones (e.g., 1055, 1065, 1066) are then called up separately. It may be noted that the calls from the teleconference server reach the participants via PSTN and/or appropriate MSCs (e.g., 1020, 1070). Calls of the responding participants are then bridged at the teleconferencing bridge. It is possible to repeat calling non-responding participants at periodic intervals for the duration of the conference to connect them in the middle of a teleconference.

Process 1530: Teleconferencing among the called-in participants progresses with their calls linked through the teleconferencing bridge. During the course of a teleconference, it is possible for the chairperson or other authorized persons to send SMS messages to SMS exchange 1050 for performing specific value-addition services. For example, a chairperson may send an SMS message to call up one or more new members for inclusion in the teleconference. On completion of the teleconference, the chairperson hangs up his/her connection signaling the end of teleconference.

Process 1535: The teleconference server disconnects the telephone connections from the teleconferencing bridge 1010 and performs billing and settlement functions.

OTHER EMBODIMENTS

As mentioned earlier, timed tele-messaging is yet another example of value-addition service that can be supported by SMS exchange 205 or 1050. A user can send an SM to the SMS exchange instructing the system to send a message incorporated in the SM at a specific time as a new SM to him/her or to another party. The SMS exchange then sends the message contained in the SM to the destination at the specified time.

Although the embodiments of the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements, which although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry, equipment, and systems embodying the principles of the invention.

What is claimed is:

1. A method for processing a short message service (SMS) message comprising
   embedding a value-added field in the SMS message by an originator of the SMS message, the field being indicative of a value-added service requested by the originator, and
   instantiating the value-added service from the combination of the field supplied by the originator and originator-specific data pre-stored in an originator database,
   wherein the field relates to a teleconference and includes telephone numbers or member identifiers of participants and further including initiating a teleconference call to each of the participants.

2. A method for processing a short message service (SMS) message comprising
   embedding a value-added field in the SMS message by an originator of the SMS message, the field being indicative of a value-added service requested by the originator and wherein the value-added service is instantiated from the combination of the field as supplied by the originator and originator-specific data pre-stored in an originator database, processing the field to instantiate the value-added service, and implementing the value-added service based upon the processed field in the SMS message and the originator-specific data in the database, wherein the field relates to a teleconference and includes telephone numbers or member identifiers of participants and the implementing includes initiating a teleconference call to each of the participants.

3. A method for establishing a teleconference via a short message service (SMS) message comprising embedding a teleconference field in the SMS message by an initiator of the teleconference, and instantiating the teleconference from the combination of the field as supplied by the initiator and initiator-specific data pre-stored in an initiator database.

4. A system for initiating a teleconference via a short message service (SMS) message comprising means for embedding a teleconference field in the SMS message by the initiator of the teleconference, and a teleconference bridge for establishing the teleconference based upon information in the teleconference field.

* * * * *